March 9, 1943.  F. E. WOLCOTT  2,313,112
BEVERAGE MAKING DEVICE
Filed Dec. 12, 1939
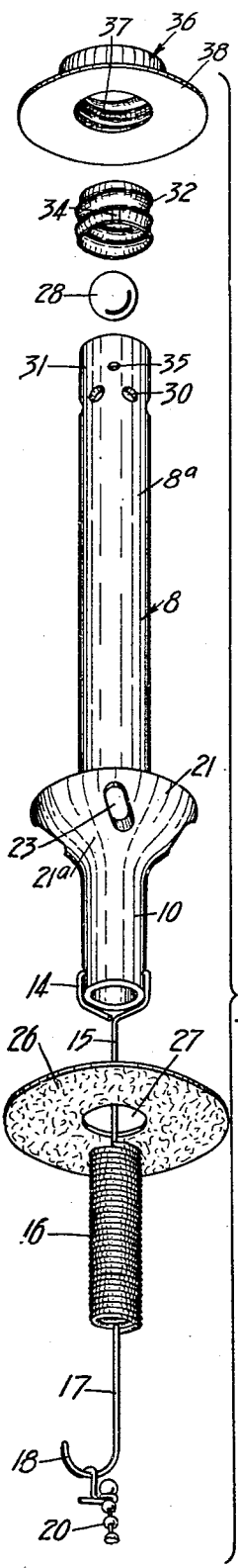
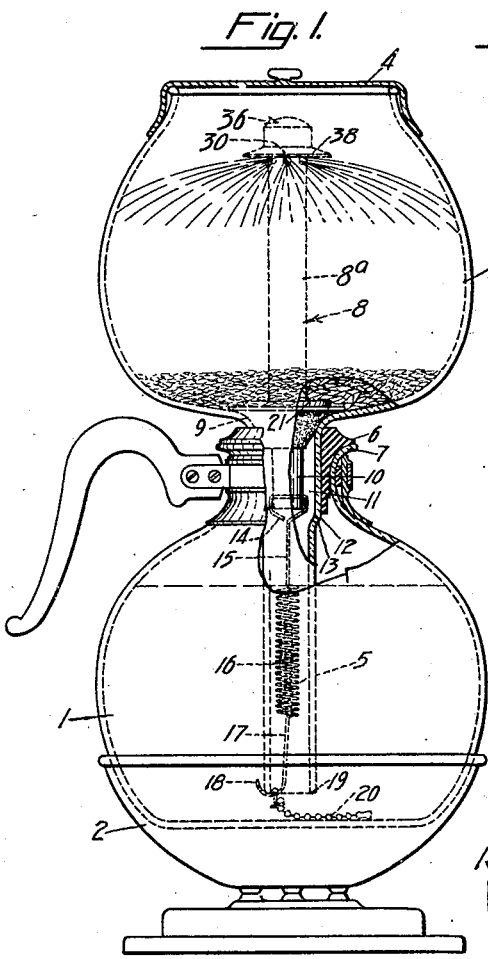
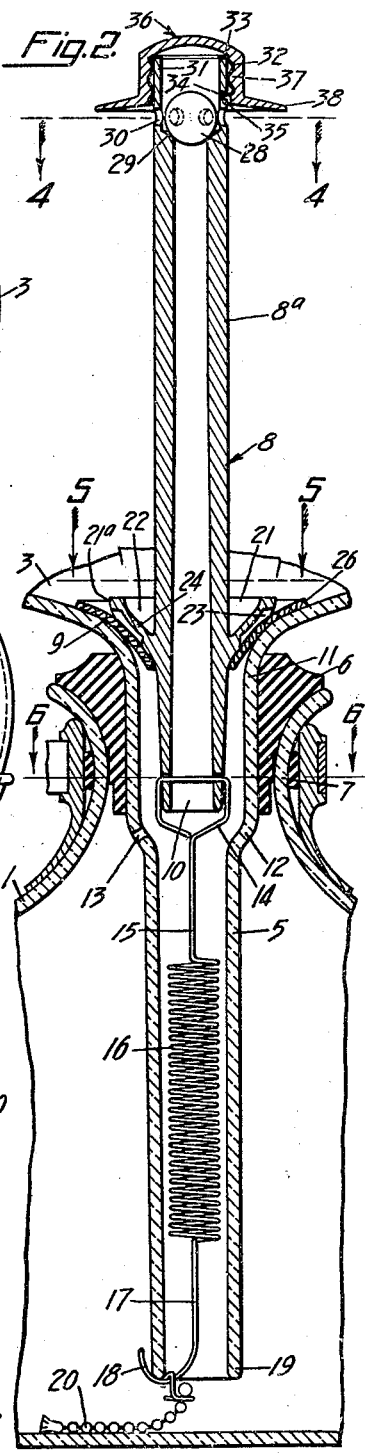
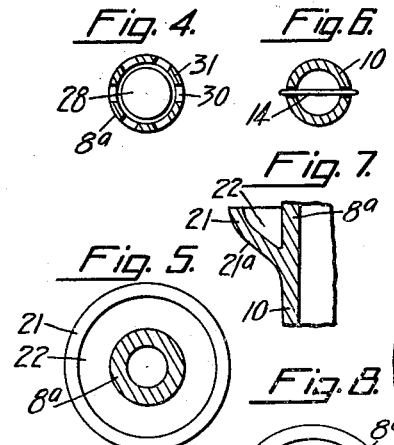
INVENTOR
Frank E. Wolcott
By
ATTORNEY Patented Mar. 9, 1943

2,313,112

UNITED STATES PATENT OFFICE 2,313,112

BEVERAGE MAKING DEVICE

Frank E. Wolcott, West Hartford, Conn., assignor to The Silex Company, a corporation of Connecticut Application December 12, 1939, Serial No. 308,841

11 Claims. (Cl. 53—3)

My invention relates to beverage making devices.

It has among its objects to provide an improved beverage maker and, more particularly, an improved construction of the vacuum type which, while also adapted to make coffee, is especially adapted to use in connection with making tea. A further object of my invention is to provide improved combined straining and spraying means adapted to be so mounted in and connected in an improved manner to the upper bowl of a vacuum type brewing device as to cooperate with that bowl in an improved manner to control the upward and downward flows between the bowls and coordinate them in an improved manner with the spray. A still further object of my invention is to provide such an improved construction having an improved cup type filter adjacent the lower end thereof and adapted to be seated in the mouth of the stem of the upper bowl and having improved flow controlling means cooperating with a filter disc clamped between the cup filter and the mouth of the upper bowl stem, in such manner as to enable improved results especially adapted to the brewing of tea, to be obtained. Other objects include the provision of such an improved construction having a tube of an improved construction and also connected at its lower end by improved means to the lower end of the upper bowl stem, and the provision of such an improved tube adapted to cooperate in an improved manner with the strainer means and with the pressure escape or port means in the top of the stem of the upper bowl and also with the spray means on the upper end of the tube in so governing the flow between the upper and lower bowls of a vacuum type beverage making device as to make improved tea making results obtainable, while also making possible the provision of a markedly simplified construction which is adapted to operate with certainty and to be very economically produced. These and other objects and advantages of my improved construction will, however, hereinafter more fully appear.

In the accompanying drawing, I have shown for purposes of illustration, one embodiment which my invention may assume in practice.

In this drawing:

Figure 1 is a side elevation, partially in section, of a complete tea making device constructed in accordance with my improvements;

Fig. 2 is an enlarged partial sectional view showing my improved combined straining and spraying device connected in operative position in the upper bowl thereof;

Fig. 13 is a perspective view showing the various parts of the combined straining and spraying device in spaced relation one above another to facilitate illustration;

Fig. 4 is a detail sectional view on line 4—4 of Figure 2;

Fig. 5 is a like sectional view on line 5—5 of Figure 2;

Fig. 6 is a detail sectional view on line 6—6 of Figure 2;

Fig. 7 is a detail vertical section through the unrecessed portion of the strainer cup, and Fig. 8 is a section similar to Figure 5, but showing a modified construction.

In this illustrative construction, I have shown a tea maker of the vacuum type, including a lower hot water or dispensing bowl 1 mounted on and heated by any usual stove 2 and having an upper bowl 3 provided with a usual cover 4 and having a stem 5 extending down through a seal 6 in the neck 7 of the lower bowl; improved combined straining and spraying means, generally indicated at 8, being carried in the upper bowl 1 and seated in the mouth 9 of the stem 5 thereon and suitably connected to the lower end of the latter stem, all as hereinafter more fully described.

Referring more particularly to this combined straining and spraying means 8, it will be observed that the same includes a short unitary tube 8a, herein formed of a suitable light molded composition material, as, for example, Bakelite or Durez. As shown, the lower end 10 of this tube 8a extends into the enlarged portion 11 of the stem 5 and terminates just above the bottom shoulder 12 on that stem and also above the usual lateral hole or pressure escape aperture 13 provided in the shoulder 12. Here also it will be observed that this lower end of the tube is tapered toward its bottom and has a spring stirrup member 14 centrally pivoted therein just above the tube bottom and extending below the open bottom extremity of the tube in such manner as to swing freely relative thereto. Herein, the stirrup member 14 is also connected at its bottom to a longitudinally extending spring portion 15 disposed axially above and connected to the top of a coiled spring portion 16 which is, in turn, connected by another longitudinally extending axially located portion 17 to a holding clip 18 adapted to be hooked over the lower extremity 19 of the stem 5 and connected or released by a usual pull chain 20. Thus, when my improved filtering structure, hereinafter described, is provided on the tube 8a above its lower end 10 and seated in the mouth 9 of the lower bowl stem 5, it will be apparent that the whole mechanism 8 will be securely located by the spring in the stem mouth while being of such light weight and having its weight so disposed, as readily be be maintained in the desired vertical position in the upper bowl.

Referring next to the strainer or filtering structure, it will be observed that carried upon the member 8a, herein at a point spaced above the tapered lower end 10 thereof, is also improved straining or filtering means especially adapted to use in connection with the brewing of tea. These means include a cup-shaped strainer member 21, herein integral with the tube 8a, having outwardly and upwardly disposed generally convex outer walls 21a and an annular chamber 22 having concave inner walls and enclosed within this member 21 and surrounding the tube 8a. Here it will also be noted that the outer walls of this member 21 are smooth over the major portion of this member and have a substantially straight taper in their lower halves so that the surface thereon is adapted to engage a relatively wide annular band on a filter disc pressed thereby against the reversely disposed convex surface of the lower bowl mouth 9. Herein, also improved passage means are provided in the outer surface 21a of this cup member 21. As shown, these means include a small number, herein four, of elongated, shallow angularly disposed recesses 23 in this outer surface. More particularly, these recesses 23 are equally spaced around the member 21 between substantially wider, smooth or unrecessed portions of the outer surface 21a thereof, while they also extend above and below the annular contact band between the surface 21a and the bowl mouth 9. Here it will also be observed that while their depth may be varied, these recesses herein are separated from the chamber 22 by thin septums 24 and are angularly disposed as shown relative to the axis of the cup. Cooperating with the shallow recesses 23 is also a usual annular filter member or disc 26 of cloth or other suitable filtering material and having an axial aperture 27 and adapted to be readily strung on over the portions of the spring mechanism and the lower tapered end 10 of the tube, as shown in Figure 3, into the operative position shown in Figure 2. Thus, when the outer surface 21a of the cup 21 presses a band on the filter disc 26 against the convex mouth 9 of the stem 5, it will be apparent that when the spring connection 18 is connected to the lower extremity 19 of the stem 5, the recesses 23 will afford a limited communication between the bowls 1 and 3 which cannot be cut off no matter how tightly the outer surface 21a of the cup 21 presses the strainer disc 26 against the mouth 9.

In my improved construction, the upper end of the tube 8a also carries improved spray means and improved means for controlling the spray. Herein, a heavy ball 28, as, for example, a steel ball, is normally seated on a seat 29, below the top of the upper end of the tube 8a and also below a series of radially disposed lateral outlets 30 in the base of wall portions 31 of reduced cross section forming a wider passage in the upper extremity of the tube. Further, it will be noted that on the outer surface of these walls 31, a threaded shell 32 is provided at a point above the lateral outlets 30, this shell having a top flange 33 overlying the top of the walls 31 and also having a bent-in portion or nib 34 on its lower end extending into a suitable hole 35 in the wall 31 to fix the member 32 against rotation or longitudinal separation from these walls. Moreover, it will be observed that a hollow cap, herein also formed of suitable composition and generally indicated at 36, is provided with internal threads 37 formed therein and adapted to cooperate with the threaded sleeve 32 to close the upper end of the tube and limit the movement of the ball 28; while this cap is also provided with annularly disposed slightly downwardly disposed flange means 38 on its bottom edge adapted to cooperate with the lateral outlets 30 and direct and spray issuing therethrough when the ball 28 is lifted, downward in the bowl 3, as indicated in Figure 1.

In the use of my improved construction, it will be understood that when it is desired to brew tea, the water to be heated by the stove 2 is placed in the lower bowl 1 and the tea is placed in the upper bowl 3 around and over the cup-shaped strainer member 21 and filter disc 26. As the water becomes heated, the low initial pressure developed in the bowl 1 above the surface of the water therein, escapes through the port or opening 13 up through the upper enlarged portion 11 of the stem 5. However, when the water in the bowl 1 is brought to a boil, the capacity of the port 13 then being exceeded, the pressure in the top of the bowl 1 acts to force the boiling water up through the stem 5 and in such manner as to raise the ball 28 and cause the boiling water to be sprayed in large volume through the apertures 30 and under the flange 38 over the top of the tea leaves. Here, also, it will be observed that before this spray of boiling water begins, the water passing up around the lower end 10 of the tube 8a is so delayed or retarded in its upward movement by the member 21, that this water does not enter the bowl 3 and submerge or float the tea leaves in advance of the spray. Thus, in my improved construction, due to the upward flow retarding effect of my improved strainer structure, it is made possible to obtain the full benefit of the spray of boiling water on the top of the tea leaves. It will also be observed that this same strainer structure acts, after the upward flow through the stem 5 has ceased and while the stove 2 and bowl 1 are cooling, to retard the downward flow of the brewed liquid into the bowl 1 in such manner as thus, by retaining the liquid in the upper bowl 3 during the desired brewing period, to time the steeping interval as desired. In the operation of the device, it will of course also be understood that the ball 28 cooperates with these means and the hole 13 to prevent the discharge of spray until the water is boiling, and prevent the entrance of cold air into the bowl 1.

As a result of my improved construction, in addition to obtaining the above advantages, it is also made possible to produce the combined strainer and spray mechanism in simple and inexpensive form, and, through forming the member 8a of composition, materially to reduce the weight of the mechanism. Further, by utilizing a light member 8a, it is also made possible to seat the strainer mechanism securely in the mouth 9 of the bowl stem 5 with the spring mechanism described. It will also be observed that in my improved construction, the stirrup connection of the spring to the tapered lower end of the tube is such as to enable the spring to act axially of the tube 8a and in such manner as to center the strainer mechanism in the mouth 9 of the stem 5. Attention is also directed to the fact that my improved spray mechanism at the top of the tube acts not only to direct the spray down below the tea leaves, but further provides a means by which access may readily be had to the ball 28 and interior of the tube 8a whenever desired.

In Figure 6 I have shown a modified construction which, while not preferred, may be used if desired. In this construction, small holes 25 are provided in certain of the septums 24 affording communication between the recesses 23 and the chamber 22, these holes therein being two in number and diametrically opposite one another.

While I have herein specifically described these embodiments which my invention may assume in practice, it will be understood that the same are shown for purposes of illustration, and that the invention may be modified and embodied in other forms without departing from its spirit or the scope of the appended claims.

What I claim as new and desire to secure by Letters Patent is:

1. For a vacuum type beverage brewer comprising an upper and a lower bowl having a seal therebetween and a stem in the upper bowl extending through said seal into the lower bowl, a combined strainer and spraying device including a spray tube adapted to be positioned in said upper bowl and to extend into said stem, valve controlled spray means at the upper end of said tube, a strainer disc, and substantially closed means on said tube adapted to press said disc against said mouth around the latter, said means having elongated recesses in the surface thereof and extending angularly in two directions and open only in the direction of said disc for permitting a limited flow between said bowls.

2. A combined strainer and spraying device as claimed in claim 1, and including a pressure member engaging said strainer disc and having limited flow recesses surrounded by a wall in the outer surface of and spaced below the upper edge of said member.

3. A combined strainer and spraying device for insertion in a vacuum type beverage maker including the combination of a tube, a spray mechanism at one end of said tube including spray aperture means, a gravity valve, a cap closing said end, and a spray directing flange on said cap.

4. For a vacuum type beverage brewer of the character described, a combined strainer and spraying device including a spray tube having a cup-shaped portion intermediate its ends and integral therewith, the outer surface of said portion having elongated recesses therein extending angularly to the axis of said tube in two directions thereon.

5. For a vacuum type beverage maker of the character described, a combined strainer and spraying device including a spray tube having a strainer portion intermediate the ends thereof, the upper end of said tube being open and having a gravity valve fitted therein and apertures extending through the wall of said tube above said valve, a cap closing said end, a threaded sleeve for securing said cap to said tube, and a flange extending from the peripheral edge of said cap for directing the flow of liquid from said apertures.

6. For a beverage maker of the character described, a combined strainer and spraying device comprising a spray tube having a strainer portion intermediate the ends thereof, the upper end of said tube having a gravity valve seated therein and apertures extending through the wall thereof above said valve, a sleeve surrounding and secured to said tube adjacent said end, and a cap threaded to said sleeve for closing said end.

7. A combined strainer and spraying device as set forth in claim 6, said cap having an annular flange extending from the peripheral edge thereof for directing the flow of liquid from said apertures.

8. For a beverage maker of the character described, a combined strainer and spraying device comprising a tube having spray apertures near the upper end thereof, a valve including gravity means seated within said tube below said apertures, a sleeve surrounding a portion of said tube adjacent said end, an extension on said sleeve engaging an abutment in said tube for securing the sleeve thereto, and a cap threaded to said sleeve and closing the end of said tube.

9. A beverage maker of the character described comprising a unitary structure of molded plastic material including a tube member having a strainer portion, a cup-shaped flange extending therefrom, a valve seat within said tube and spaced from the upper end thereof and apertures extending through the sides thereof above said valve seat, gravity valve means on said seat, and a detachable cap for closing the upper end of said tube; said cap having a surrounding flange extending laterally from the edges thereof for directing flow from said apertures.

10. For a vacuum type beverage maker comprising an upper and a lower bowl having a seal therebetween and a stem on the upper bowl extending through said seal into the lower bowl, a combined strainer and spraying device including a spray tube adapted to be positioned in said upper bowl and to extend into said stem, valve controlled spray means at the upper end of said tube, a strainer disc, and a pressure member surrounding said tube and having a tapered portion and shallow elongated recesses surrounded by a wall below the outer surface of and spaced below the upper edge of said pressure member and extending across a line of contact between the said member and the mouth of the stem, certain of said recesses having small holes in the bottoms thereof for communicating with the interior of the upper bowl.

11. For a vacuum type beverage maker of the character described, a combined strainer and spraying device including a spray tube having a tapered outer surface and a plurality of spaced elongated shallow recesses having a surrounding wall in said surface and extending across an annular contact zone between the top and bottom of said surfaces, certain of said recesses including holes in the bottoms thereof and extending through the wall of said cup-shaped portion.

FRANK E. WOLCOTT.